INVENTOR.
RAOUL A. ROUGEMONT
BY

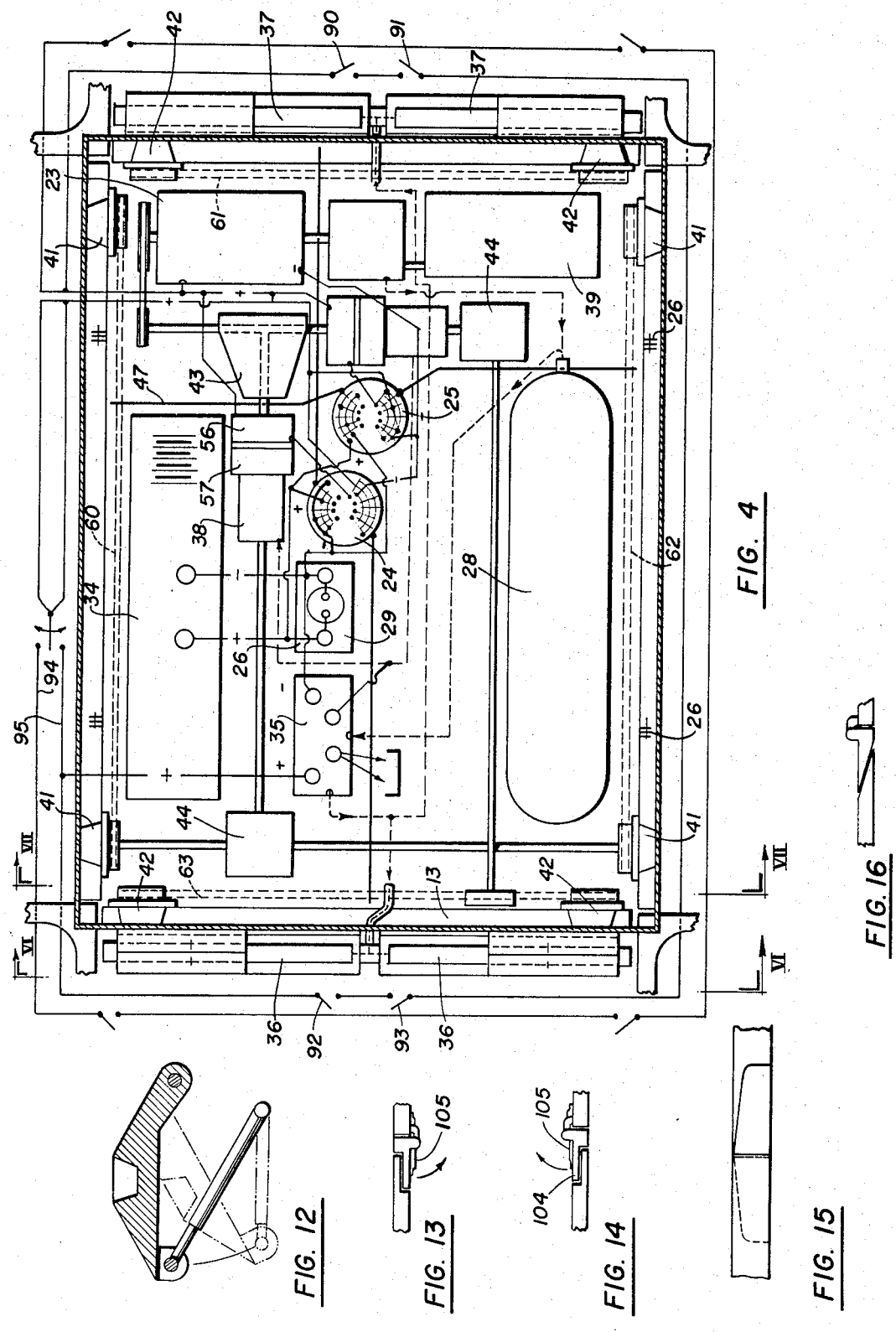

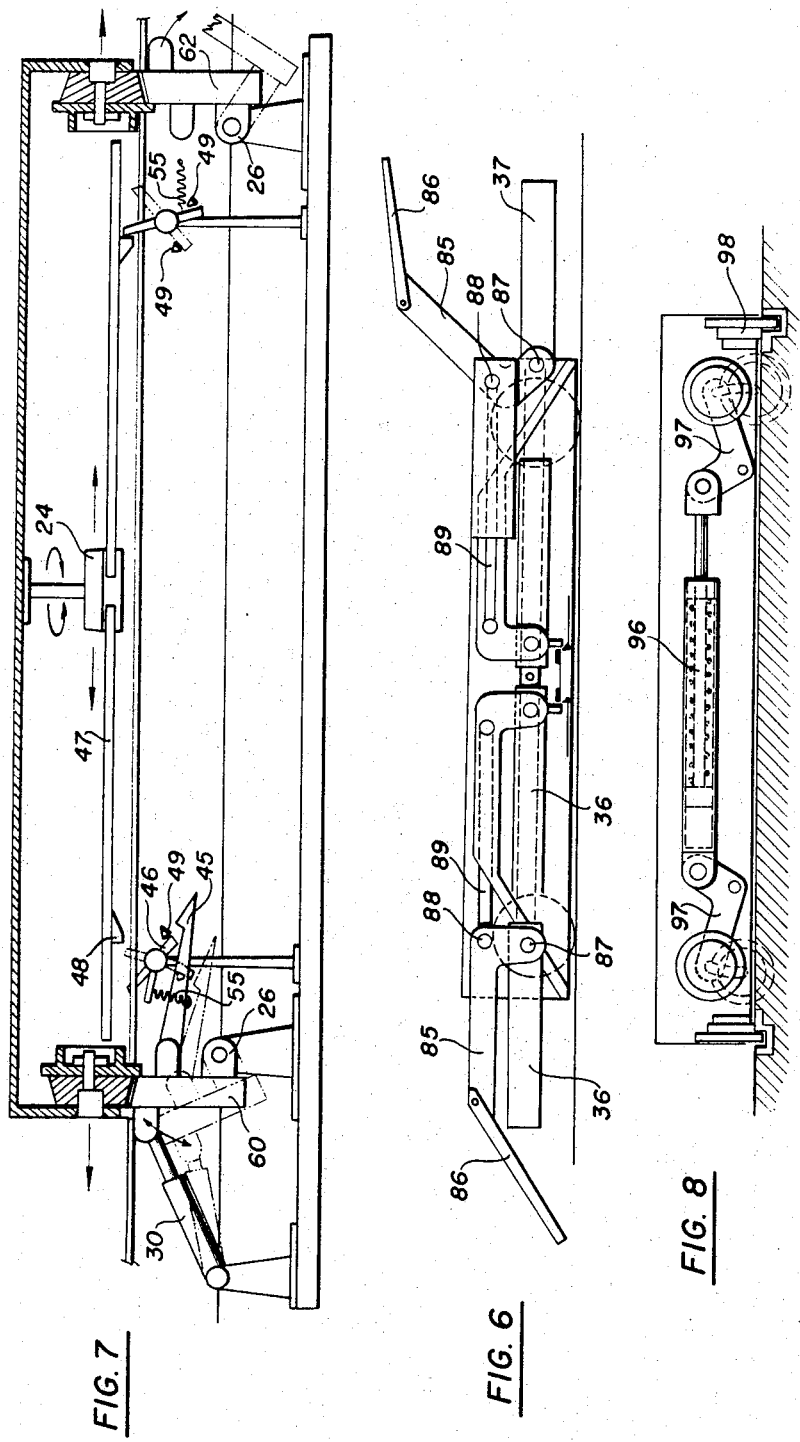

United States Patent Office 3,414,141
Patented Dec. 3, 1968

3,414,141
PARKING DEVICE WITH CONTROL MEANS IN EACH STALL TO CONTROL THE MOVEMENT OF A VEHICLE CARRIER
Raoul Albert Rougemont, 6 Allee de la Residence de la Peupleraie, Fresnes, France
Filed May 10, 1965, Ser. No. 454,263
6 Claims. (Cl. 214—16.1)

ABSTRACT OF THE DISCLOSURE

This invention relates to a parking garage and, more particularly, to apparatus for the storage of automobiles including a building having several floors joined by an elevator, each floor having a rectilinear network of tracks for guiding a platform on which an automobile is carried.

BACKGROUND OF THE INVENTION

In the construction and operation of parking garages, there have been many problems that have needed solution. When the engine is used to move the automobile around in the building, the products of combustion remain and cause undesirable working conditions. In most cases, the entrances and exits necessitated by substantial traffic in and out could be provided only by using a layout having a large dimension along the street. In most cases, the necessary ramps and through passages have used a considerable percentage of the land area and floor space. These and other difficulties experienced with the prior art devices have been obviated in a novel manner by the present invention.

It is, therefore, an outstanding object of the invention to provide a parking garage in which air pollution due to the operation of the automobiles is reduced to a minimum.

Another object of this invention is the provision of a parking garage in which the use of the land area and floor space for transport of the vehicle represents a small percentage of the whole.

A further object of the present invention is the provision of a parking garage in which the storage or retrieval of a particular automobile takes place very rapidly.

With these and other objects in view, as will be apparent to those skilled in the art, the invention resides in the combination of parts set forth in the specification and covered by the claims appended hereto.

SUMMARY OF THE INVENTION

In general, the invention consists of a parking garage comprising a building having a plurality of levels, each level having a plurality of compartments arranged rectilinearly. The garage is provided with a platform for carrying a vehicle and a motor is mounted on the platform for its operation. An elevator extends vertically between the floors and a dispatcher is provided for moving the platform between the elevator and a selected compartment.

BRIEF DESCRIPTION OF THE DRAWINGS

The character of the invention, however, may be best understood by reference to one of its structural forms, as illustrated by the accompanying drawings, in which:

FIG. 4 is a horizontal sectional view of a platform and compartment forming part of the invention, FIG. 6 is a longitudinal vertical sectional view of the platform taken on the line VI—VI of FIG. 4, FIG. 7 is a transverse vertical sectional view of the platform taken on the line VII—VII of FIG. 4, FIG. 8 shows a modified form of the invention, FIG. 12 is a modification of the device shown in FIG. 11, FIG. 13 is a plan view of a rail junction, FIG. 14 is an elevational view of the junction shown in FIG. 13, FIG. 15 is an elevational view of another rail junction, FIG. 16 is a plan view of the junction shown in FIG. 15.

DESCRIPTION OF THE PREFERRED EMBODIMENT

Figures 1, 3, 17:
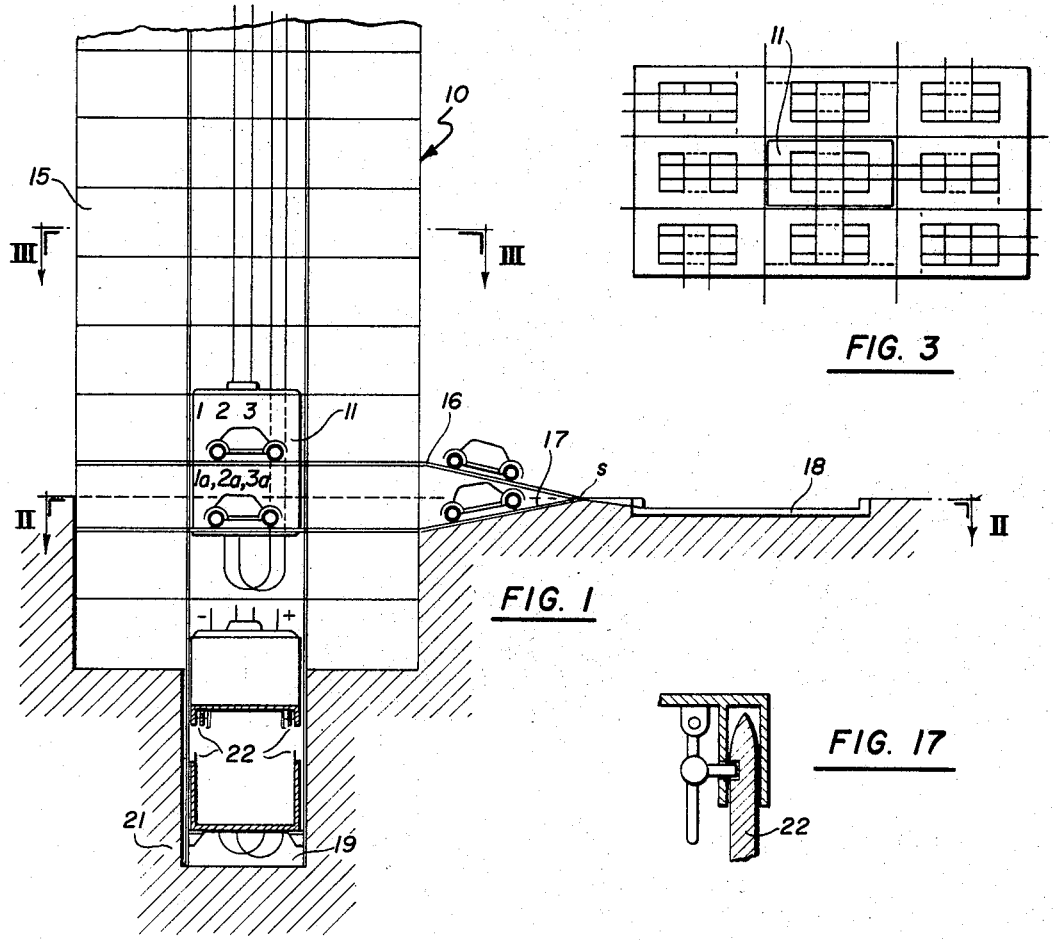
FIG. 1 is a vertical sectional view of a parking garage embodying the principles of the present invention.
FIG. 3 is a horizontal sectional view of the garage, taken on the line III—III of FIG. 1.
FIG. 17 shows the details of a connection between portions of an elevator.

The parking garage, indicated generally by the reference numeral 10, consists of a plurality of levels or stories and is intended to be operated either completely automatically or semi-automatically. It is intended to be used for storing motor vehicles, trailers, and the like and to be located beside a street or at a harbor or railway station. The garage provides for direct access by the vehicle to an elevator 11 and to compartments 12 located on the various levels. The arrangement permits operation with a minimum number of ramps, tracks, turntables and allows a maximum utilization of land area. Rapid circulation of the vehicles within the garage is permitted, and a vehicle can be stored or retrieved in a very short time. Because the motor of the vehicle is shut off as soon as the car is in the elevator, air pollution in the garage is substantially reduced. A main element of the conveying system within the garage is a platform 13 which is operated by a control or dispatcher 14 to move to a particular storage comparement 12. This platform is capable of moving along rails in all four directions from compartment to compartment and to the elevator 11. The dispatcher 14 is located in a central control room on a distributing level of the building and controls any operation by means of automatic stops located in the platforms and the compartments. This dispatcher has indicators showing the compartments which are available and towards which it sends the elevator and the platforms to store a vehicle.

Figure 2:
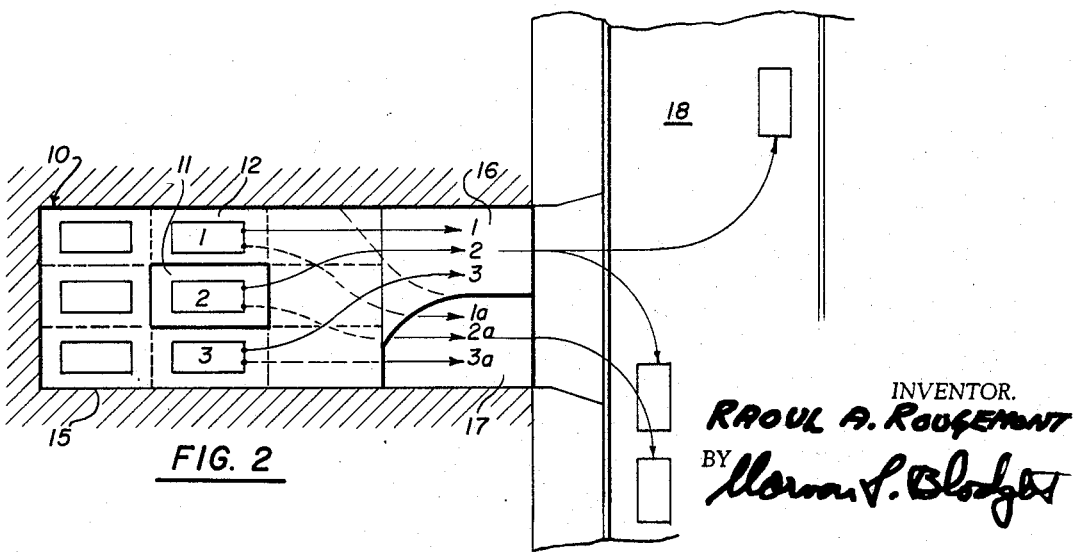
FIG. 2 is a horizontal sectional view of the garage, taken on the line II—II of FIG. 1.

As shown in FIG. 1, the garage is constructed in the form of a building 15 having a metal framework in which the compartments 12 are arranged in several levels in a rectilinear manner with the elevator 11 centrally located. The distance between the floor and ceiling of each level may be quite small, i.e., slightly larger than the heignt of a vehicle. As is evident from the drawing, the elevator 11 has two stories to allow two simultaneous loadings at two distributing levels. These levels correspond to two ramps 16 and 17. The ramp 16 is half a story above the level S of the street 18 and leads upwardly, while the ramp 17 is half a story below the street and leads downwardly. The arrangement permits vehicles coming in or out to operate in four lanes (as is evident in FIG. 2) to facilitate movement to and from the street 18. It should be noted, also, that, at peak hours when a great many cars are to be brought out, the distributing levels of the garage can be filled with cars ready to be introduced onto the ramps. The drawings, of course, show a garage of rather limited size and are intended to show how easy it is to build such a garage having a very narrow front wall; in practice, the "ready storage" on the distributing levels will always be much larger. FIGS. 1 and 2 show that, due to the location of exits, 1, 2, 3, 1a, 2a, and 3a (as well as the front and back of the elevator 11), it is quite easy to store or retrieve vehicles.

It is advantageous during "off-peak" hours to handle as little deadweight as possible. For that reason, the lower part of the elevator 11 is disconnectable. A deep pit 19 is provided to allow the elevator to be lowered somewhat lower than when at the lowest distribution level. At this position, the lower part of the elevator rests on a foundation 21. A disconnecting device 22 is used with suitable controls to unlock assemblies located at the four corners of the lower part of the elevator. A reverse operation is provided for re-connection. The electrical supply for the elevator 11 is brought into the upper part of the elevator and through conventional flexible leads to the lower part.

FIG. 4 shows a plan view of a platform 13 with superstructure removed, while FIGS. 6, 7, and 8 show various vertical views of it. All distributive movements of the vehicles within the garage take place by use of the platforms, along with the elevator 11. Certain movements are described hereinafter that requires only a single impulse from the dispatcher 14. In order to understand the invention, it is necessary to distinguish three cases. First, there is the situation where the vehicle is being stored or retrieved from a compartment that is located either immediately to the right, left, rear, or front of the elevator 11. In this case, the controlling device for the dispatcher 14 consists of only one electric cable for each direction; no controlling device is necessary in the compartments.

The second situation is that of extended right-angle translation; it is possible to send or return a vehicle in any direction without limitation in the number of compartments passed through. In this case, the controlling device for the dispatcher uses a cable for each compartment in the path of movement.

Figure 5:
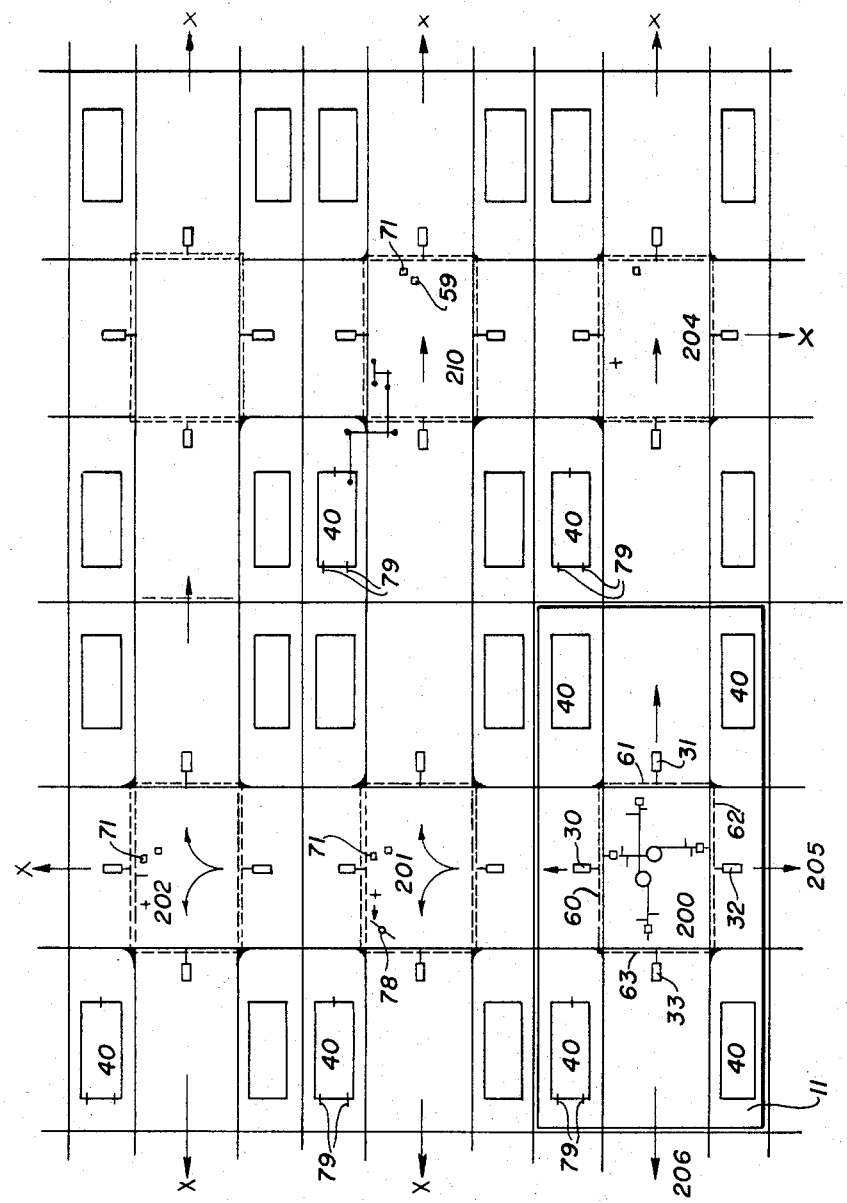
FIG. 5 is a plan view of one level of the garage.

The third case is that of a branched path, wherein the vehicle reaches a compartment remote from the elevator and then is moved on a path which is at a right angle to the original direction of movement. One command from the dispatcher is sufficient for automatic operation, including loading and unloading; each time a compartment is traversed (either by passing straight through or by entering in one direction and leaving at a right angle), one control cable is necessary. The economies and the simplicity inherent in this system can be readily seen. The controls which regulate these automatic movements are shown in compartment 200 in FIG. 5. This system is not only for starting the platform in the required direction, but also a blocking means during loading and unloading operations and while the elevator is moving up and down. FIG. 5 shows the crossing of the rails on one horizontal level to form the compartment 200 and FIG. 4 shows that the rails 60, 61, 62, and 63 cross at that point. These rails can be separately folded back by control jacks 30, 31, 32, and 33, respectively. FIG. 7 shows the rail 60 moved into operative and inoperative positions by the jack 30. FIG. 4 shows the construction of the angles 51, 52, 53, and 54 used at the intersections of the rails. The lowerable portions of the rails are placed with their ends immediately adjacent to the fixed crossing angles, thus assuring against the possibility of the rails coming apart and, at the same time, solving the problem of maintaining continuity of level. The rails can be formed with any of the well-known profiles.

When the platform 13 is inside of the compartment 12 defined by four rails 60, 61, 62, and 63, it is held tightly in place and cannot move in any direction. However, if a section of rail be lowered, the platform can move in that direction under the impetus of a motor 23 mounted on the platform. The direction of rotation of the motor and the drive system associated therewith are designed to give motion in the desired direction.

In FIG. 4 are shown two rotary switches 24 and 25 and a storage battery 34 for supplying electrical current to the motor 23, as well as the electrical contacts of a translator H which suppresses the cable between the platform and the elevator. A hydraulic pump 27 is coupled to one side of the motor 23. This pump brings about a recharge of a pneumatic-hydraulic accumulator 28 as soon as the motor starts running; the motor power and the output of the pump are selected in accordance with the forces to be applied to the platform system. A box 29 contains the translator 26 which receives current for recharging the storage battery 34 when the platform is is on the elevator. An electrically-actuated valve 35 feeds hydraulic fluid to cylinders 36 and 37 and to hydraulic brakes 38. Also shown are the oil reservoir 39, four drive wheels 41 for longitudinal movement of the platform on the rails 60 and 62, four drive wheels 42 for lateral movement on the rails 61 and 63, a bevel gear 43, and two speed reducers 44.

The operation of the platform will be readily understood in the light of the above description. As a first example, let us assume that the platform is to move toward a compartment close to the elevator, i.e., from the elevator to compart 201 in FIG. 5. Let us also assume that the vehicle has been correctly placed on the elevator, as indicated by a signal lamp on the dispatcher display board. If the elevator 11 is not loaded, but is ready to start up to retrieve a stored vehicle, this is indicated by a signal lamp of a different color. The operator presses a button corresponding to a free compartment. This contact will simultaneously (1) send the elevator to the level of the building corresponding to that compartment and (2) start the impulse to actuate the jack, which will lower the rail on the side of the compartment facing toward the elevator. In the cases of extended right-angle movement of the platform away from the elevator and of "branched" movement, an additional impulse will be sent to the compartments intervening between the elevator and the selected final compartment.

FIG. 7 shows that the rail 60, when being lowered, drives a latch 45 which operates reversing rod 46 which presses bar 47 by striking a dog 48. The motion of the rod 46 is limited by fixed blocks 49. Springs 55 actuate the return of latch 45 and rod 46. This device does not actuate bar 47 when returning; it re-connects only. The rotary switch 24 is displaced by means of the well-known ball-and-spring notching system, not shown. This first displacement causes the switch to start the motor in the required direction of rotation, the wires being connected so as to obtain by each displacement of the switch a preselected wire connection to give the desired platform movements. The motor is energized or de-energized by the switch 24 and clutch-brakes 56 and 57 of the conventional type. These are shunt-connected by line 58 with the positive pole of the motor 23. As they operate by short-circuit braking when the motor is shut off, it is also mechanically disconnected and the platform wheels are braked.

Four binding posts are shown in each direction on the inside concentric part of the switches. They correspond to the coupling of the negative of each clutch-brake combination between the battery and the latter elements. When the motor 23 is energized, it transmits through the line 58 the positive current to both clutch-brake combinations. The negative is at that moment in the circuit only in the working switch, the plugs having been located for this purpose. Consequently, only the clutch for the required direction is operative. The brakes 57 are arranged after the clutches in direct connection to the drive wheels 41 and 42 and, therefore, act on the latter. The rail being open on the proper side of the compartment 202, the platform under the impetus of the motor and drive wheels 42 moves toward the compartment 201. The drive wheels 41 (which would move the platform in sideways direction) are easily disconnected from the rails due to their conical shape.

Figure 9:
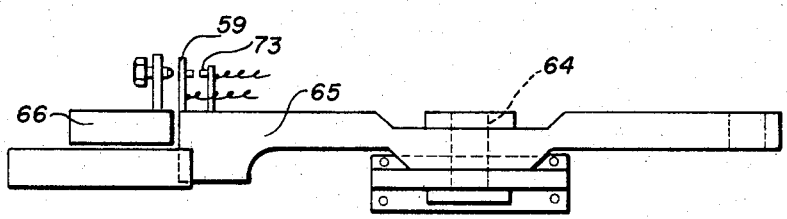
FIG. 9 shows in plan view the details of a stopping mechanism.
Figure 10:
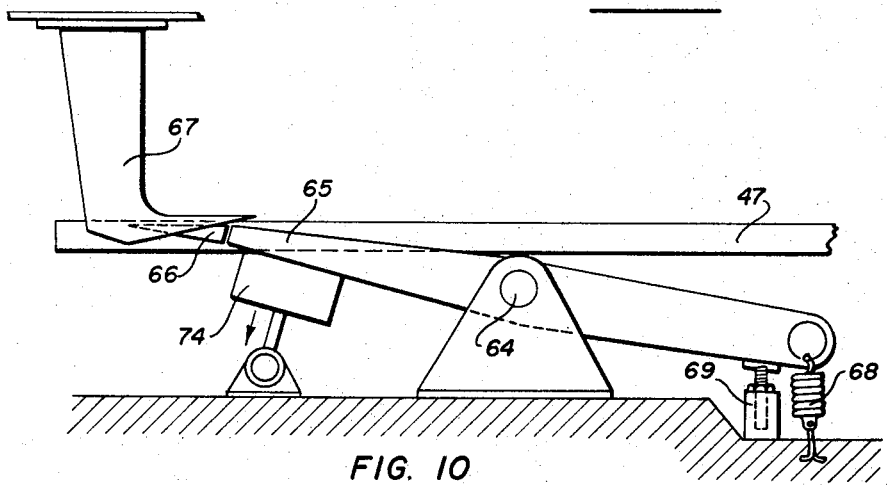
FIG. 10 is an elevational view of the mechanism of FIG. 9.

Referring to FIG. 9, when the platform arrives at a compartment, the bar 47 meets a stopping device 59. This stoping device shuts off the motor 23 and the brake for an acurate stoppage at the end of the compartment 201. This causes the bar 47 to reverse the switch 24 by one notch. The wires are so arranged as to obtain different circuits. The switch 24, like the switch 25, rotates in one direction or the other under the action of its bar 47. In rotating in a given direction, the switch gives (a) a zero point with the motor de-energized, clutch disconnected, and the brake applied; (b) first notch with brake off, clutch energized and motor running; (c) second notch, same as zero point with brake operative; and (d) third notch with motor running in reverse direction. The stopping device 59 is pivotally supported on a pivot pin 64 and has a straight portion 65. This portion engages a counter block 66 located on a side of the bar 47. It stops the bar so that it goes in the opposite direction from the platform as the platform moves forward toward the selected compartment. This relative movement between the platform and the bar takes place a sufficient amount to cause the switch 24 to rotate to its second notch. The brake is then set. A fixed ramp 67 on the platform lowers the portion 51 actuated by a return spring 68 and stopped by an adjustable stopping device 69. As a result, the block 66 escapes from the portion 65, after having set the switch at the second notch. The platform has arrived at the end of the compartment 20 and meets a block 71; the latter causes a third return of the bar 47 and the switch 24 is positioned at the third notch, which releases the brake and energizes the motor for rotation in the proper direction. The rails, which are transverse to the direction of platform movement, are not useful in the first case, only the rails which are parallel to this direction being used; the block 71 is fixed in each compartment and is used as a limit stop when traveling is accomplished. As a consequence, the platform returns to the elevator to take its place in the elevator compartment 200 (FIG. 5). The first function of the block, which is constructed like the block 59, is to bring the switch 24 back to the zero point in one movement. The cut-off position of the motor and brake corresponding to the full stop at the compartment 200. A block 72 is positioned to take into account the quick return through three notch positions and the braking time. Also carried on the end of the portion 51 is a contact 73, which, by short contact, gives a command to the dispatcher for a return; this involves a lifting of the rail 60 by the jack 30 and the elevator going down again.

In the second case of extended motion of the platform toward and away from the elevator in a single direction, let us consider the movement from the elevator compartment 200 to the storage compartment 202. The transverse rails 62, 60 are not an obstruction and the dispatcher will have lowered the blocks 59 and 71 of compartment 201 through electromagnets 74 associated with them. In the compartment 200 are a fixed block 107 and a stopping-and-reversing block 108. The platform operates in a manner similar to the first case and, after passing through the compartment 201 without stopping, strikes the stop 71 in the compartment 202; it then returns to the elevator compartment 200 and the elevator goes down again. The commands given by the dispatcher 14 to the compartments 12 are transmitted through directly-connected wires in the construction and are synchronized with signals from the elevator.

Let us next consider the third situation, i.e., where the path from the elevator to the selected compartment involves branching or movement in two directions. An example would be movement from the elevator compartment 200 (see FIG. 5) through compartment 201 to compartment 210. The starting process from compartment 200 is the same as in the other cases. A reversing latch contactor 78 is located on the side of compartment 201 opposite the side through which further movement is to proceed. As soon as the platform reaches the back of compartment 201, the rail 62 is closed again through the effect of the contactor 78 under the force of a cable which reverses it when the platform comes into contact with it. This signal, after bringing about the raising (or closure) of the rail by means of the jack behind the platform, brings about the lowering of the rail 61 facing toward the compartment 210. The bar 47 actuates the switch 24 to the first notch, so that the motor 23 starts the platform toward the compartment 210. The block 59 in the compartment 210 cuts off the motor and brakes the platform. The block 71 reverses the platform which moves back toward compartment 201 where its motor is stopped and braked and the switch is moved to zero position again. However, since it has been reversed again through contact with contactor 78, the latter operating first to lift the rail 61 and then to lower the rail 62. The contactor has operated the bar 47 which has actuated the switch 25. A return of the platform to the elevator compartment 200 is achieved.

Figure 18:
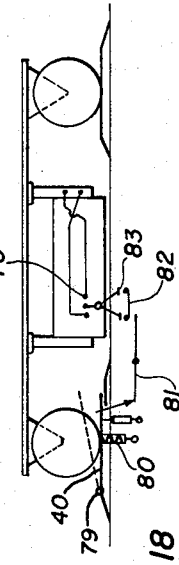
FIG. 18 is a schematic view of a vehicle lift arrangement.

It is to be noted that each compartment has a block or stopping device 59 and 71; these are arranged at right angles in the compartment 200 which must distribute in four directions. The block 78 is needed only in those compartments where branching must take place. Tables 40 can be seen in the various compartments in FIG. 5; these are raised slightly above the level of the rails to receive the wheels of the vehicle. One of these tables in the same geometric location in each compartment is set up on movable hinges 79 at one end and lifted by a spring 80 (see FIG. 18) at the other end. When a vehicle rests on the tables, it lowers a table 40 which pushes a lever 81 which acts on a pawl rocking lever 82 which is fitted with two contactors 83. These push a reversing contactor 70 in a lifting circuit when the platform is passing. A conventional double-acting cylinder is used for loading. The platform having been stopped at the selected compartment by the dispatcher and the reversing contactor 70 having been positioned on the lifting circuit, the electrical current is passed to the electromagnetic valve 35. The latter operates the hydraulic circuit and the fluid is sent to the lifting cylinders 36 and 37 (see FIG. 6). The hydraulic circuits are shown in dotted lines in FIG. 4, these being both the high pressure lines and the lines returning fluid to the reservoir 84. The pump 27 is supplied from the tank 39 and serves to charge the accumulator 28 for distribution to the brakes 38. The cylinders 36 and 37 actuate lifting arms 85; the upper base plates 86 have the necessary length and breadth to receive vehicles of different sizes.

The lifting arms 85 are pivoted on pins 87 and can slide by virtue of pins 88 in slides 89. The arms are thus guides and driven by the cylinders pushing on the pins 87 and the crank arm portions of the arms 85. The pins 88 act as pivots and the arms 85 rise while lifting a vehicle. When the compartment is not occupied by a vehicle, it is then, of course, available to receive one on a platform. The rocking lever 82 (FIG. 18) is in reverse position and will allow unloading in the compartment of the vehicle conveyed by the platform. In the second and third cases described above, a solenoid operated in a way similar to those of the stopping device 59 positions the rocking lever 82 into a neutral position and the platform passes without stopping to load or unload a compartment further on. The automatic operation can also be obtained by means of a contact operating when the table 40 is lowered to control the rocking lever 82 in the same way. The motor 23 is automatically started when the four arms 85 are lifted to their top positions, thus assuring that nothing interferes with subsequent motion of the platform. As a matter of fact, when one of the arms is not in the proper place, the circuit is not completed and power does not reach the motor. Each of the arms controls a spring contact switch 90, 91, 92, and 93 (see FIG. 4) which opens the circuit as soon as the arms are out of position. The electric circuit associated with the platform motor 23 is subjected to two logical four-variable cut-off circuits, each corresponding to a correct operation of a lifting arm 85. These cut-off circuits include a high circuit 94 for load lifting and a low circuit 95 and they are set by the contactor 70 acting under the effect of the table 40. These circuits are schematically represented in FIG. 4 by solid lines outside the platform 13; they operate between the motor 23 and the switches 24 and 25.

A modification of the present invention would include a lifting system for the platform, as shown in FIG. 8. A hydraulic cylinder 96 has an internal return spring. It pushes two arms 97 and serves to lift the platform with the force necessary for disengaging rollers 98 from the rails.

Figure 11:
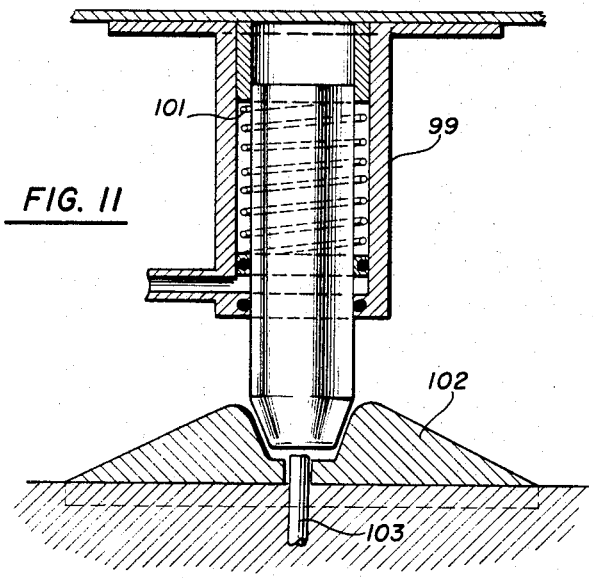
FIG. 11 is a vertical sectional view of a centering device.

Referring to FIGS. 11 and 12, the lifting operation of the platform is synchronized with a centering block 99 having a piston 100 which is lifted hydraulically or lowered through the effect of a spring 101. This serves to lock the platform in the center of the platform when lowered and to release it when lifted. This centering block 99 is retracted in the compartments passed through (in cases 2 and 3) by receiving a suitable signal from the dispatcher and the blocks. At the bottom of the socket 102 is located a contact 103 which is intended to receive the recharging current for the storage battery 34.

FIG. 3 shows somewhat schematically the layout of the rails and the tables or plates 1, 2, 3, and 4 at each compartment laid out to take into account the various sizes of vehicles admitted to the garage. These are secured to the framework CH of the building.

FIGS. 13 through 16 show the way in which adjacent ends of the rails are connected by a slot-and-tongue construction. The ends of the rails are provided with hinged portions 104 which are biased by a leaf spring 105. Once the joint has been formed by the rails being both raised, the portion 104 acts as a ramp to compensate for slight differences in level. The platform rollers can pass smoothly, therefore, from one rail to another. FIGS. 15 and 16 show rails having inclined junction surfaces. When the junctions lie between the elevator 11 and the compartments adjacent thereto, the hinged portions must compensate sufficiently to take into account the variation in stopping position of the elevator.

The invention having been thus described, what is claimed as new and desired to secure by Letters Patent is:

1. A parking garage for vehicles, comprising:
   (a) a building having a plurality of levels, each level having a plurality of compartments arranged rectilinearly,
   (b) a platform for carrying a vehicle, each compartment being provided with tables which engage the wheels of the vehicle and lift it upwardly and support it out of contact with the platform,
   (c) a motor mounted on the platform for the operation thereof, the motor on the platform being connected through a clutch and brake to wheels, each compartment being provided with stopping devices which determine the operation of the motor, clutch, and brake selectively to stop the platform or to change its direction of motion,
   (d) an elevator extending vertically between the floors,
   (e) a control means for moving the platform between the elevator and a selected compartment and between various compartments, and
   (f) rails extending through the compartments for supporting and moving the platform, two pairs of rails intersecting in the center portion of each compartment to form a rectangle, the rail portions forming the sides of the rectangle being provided with means for individually raising and lowering.

2. A garage as recited in claim 1, wherein the platform is capable of passing along the rails in any direction between the wheels and beneath the body of a vehicle so supported in a compartment.

3. A garage as recited in claim 1, wherein the platform motor is operated from a storage battery and wherein the battery is connected to a source of electrical current for charging when the platform is at rest.

4. A garage as recited in claim 1, wherein adjacent ends of aligned rails are provided with a hinged portion which acts as a ramp to compensate for differences in rail height.

5. A garage as recited in claim 1, wherein the elevator has two levels which serve simultaneously two distributing levels served respectively by one of two ramps one ascending and one descending from street level.

6. A garage as recited in claim 1, wherein one level of the elevator is selectively separable from the other.

References Cited

UNITED STATES PATENTS

| | | | |
|---|---|---|---|
| 1,584,080 | 5/1926 | Dinkelberg | 214—16.1 |
| 2,102,995 | 12/1937 | Coombs | 214—16.1 |
| 3,055,517 | 9/1962 | Kirkland | 214—16.1 |
| 3,104,019 | 9/1963 | Duff | 214—16.1 |
| 3,217,905 | 11/1965 | Frangos | 214—16.1 |
| 3,232,454 | 2/1966 | Coursey | 214—16.1 |

GERALD M. FORLENZA, *Primary Examiner.*

R. B. JOHNSON, *Assistant Examiner.*